United States Patent
Lan et al.

(10) Patent No.: US 8,525,932 B2
(45) Date of Patent: Sep. 3, 2013

(54) ANALOG TV SIGNAL RECEIVING CIRCUIT FOR REDUCING SIGNAL DISTORTION USING EQUALIZER CONFIGURING METHOD

(75) Inventors: Ching Fu Lan, Hsinshu Hsien (TW); Wen Chieh Yang, Hsinchu Hsien (TW); Yi Hsuan Lai, Hsinchu Hsien (TW); Hsin Chuan Kuo, Hsinchu Hsien (TW); You Tsai Cheng, Hsinchu Hsien (TW); Chin Fu Ho, Hsinchu Hsien (TW); Jen Hsing Wang, Hsinchu Hsien (TW); Tai Lai Tung, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/216,356

(22) Filed: Aug. 24, 2011

(65) Prior Publication Data
US 2012/0212674 A1   Aug. 23, 2012

(30) Foreign Application Priority Data
Feb. 17, 2011   (TW) .............................. 100105196 A

(51) Int. Cl.
*H04N 5/00*   (2011.01)
(52) U.S. Cl.
USPC ........................... 348/607; 348/192; 348/193

(58) Field of Classification Search
USPC .................................................. 348/192, 193
See application file for complete search history.

(56) References Cited

U.S. PATENT DOCUMENTS

| | | | |
|---|---|---|---|
| 2006/0050814 A1* | 3/2006 | Wu et al. | 375/341 |
| 2006/0176948 A1* | 8/2006 | Lee | 375/233 |
| 2008/0232453 A1* | 9/2008 | Cohen et al. | 375/232 |

* cited by examiner

*Primary Examiner* — Jefferey Harold
*Assistant Examiner* — Samira Monshi
(74) *Attorney, Agent, or Firm* — WPAT, PC; Justin King

(57) ABSTRACT

An analog television (TV) signal receiving circuit and method and an associated equalizer coefficient configuration apparatus and method are disclosed for correcting a distortion problem occurred in a reception process of an analog TV signal by configuring an equalizer in the analog TV signal receiving circuit. The analog TV signal receiving TV includes a tuner, an analog-to-digital converter (ADC), and a demodulator. The tuner receives an analog radio-frequency (RF) TV signal to generate an analog frequency down conversion signal. The ADC generates a digital frequency down conversion signal according to the analog frequency down conversion signal. The demodulator includes a front-end circuit for generating a digital demodulated signal according to the digital frequency down conversion signal, and an equalizer for generating a digital receiving signal according to the digital demodulated signal. The equalizer includes a plurality of correction coefficients that are generated according to a predetermined rule.

18 Claims, 6 Drawing Sheets

ANALOG TV SIGNAL RECEIVING CIRCUIT FOR REDUCING SIGNAL DISTORTION USING EQUALIZER CONFIGURING METHOD

CROSS REFERENCE TO RELATED PATENT APPLICATION

This patent application is based on Taiwan, R.O.C. patent application No. 100105196 filed on Feb. 22, 2011.

FIELD OF THE INVENTION

The present invention relates to an analog television (TV) signal receiving circuit, and more particularly, to an analog TV signal receiving circuit and method thereof and an associated equalizer coefficient defining apparatus and method thereof.

BACKGROUND OF THE INVENTION

A receiver is a crucial component in analog TV technology. As digital technology develops, cost for realizing an analog TV receiver via a digital manner is reduced day by day and becomes more widely applied in consumer equipment. However, during design of an all-in-one chip, certain functional circuits cannot be integrated to the all-in-one chip due to the limitations of some practical applications, e.g., large areas of the functional circuits. Therefore, some circuits of the analog TV receiver are still being realized by analog components, e.g., an analog tuner. However, since such types of analog components are not completely ideal, signal distortion occurs when the analog TV receiver receives an analog TV signal, e.g., a ringing effect or a ghost effect may occur.

Since signal distortion is high-frequency (HF) components of the signal being weakened or removed, an analog filter is applied in the prior art to directly compensate the weakened or removed HF components to minimize signal distortion. However, since such an approach generally directly compensates the HF components without systematically estimating an extent of the signal distortion before the compensation, adjusting effect of the signal distortion is not ideal and details of a frame image may also be damaged in the process. Thus, there is a need in the art for enhanced techniques for minimizing signal distortion during analog television signal reception.

SUMMARY OF THE INVENTION

In view of the foregoing issues, one object of the present invention is to provide an analog TV signal receiving circuit and method thereof and an associated equalizer coefficient defining apparatus and method thereof to adjust the distortion problem occurring in a reception process of the foregoing analog TV signal.

According to an embodiment of the present invention, an analog TV signal receiving method comprises receiving an analog radio frequency (RF) TV signal; generating a digital demodulated signal according to the analog RF TV signal; and adjusting the digital demodulated signal via an equalizer circuit to generate a digital receiving signal, wherein the equalizer circuit comprises a plurality of adjustment coefficients that are generated according to a predetermined rule.

According to another embodiment of the present invention, an analog TV signal receiving circuit comprises a tuner for receiving an analog RF TV signal to generate an analog frequency down conversion signal; an analog-to-digital converter (ADC), for performing analog-to-digital conversion on the analog frequency down conversion signal to generate a digital frequency down conversion signal; and a demodulating circuit, comprising a front-end circuit and an equalizer. The front-end circuit generates a digital demodulated signal according to the digital frequency down conversion signal, and the equalizer is associated with a plurality of adjustment coefficients that are generated according to a predetermined rule.

According to yet another embodiment of the present invention, a method for defining adjustment coefficients of an equalizer applied to an analog TV signal receiving circuit comprises providing an analog TV signal; generating a digital reference signal according to the analog TV signal; generating an analog RF TV signal according to the analog TV signal; generating a digital demodulated signal according to the analog RF TV signal via the analog TV signal receiving signal; generating a digital receiving signal according to the digital demodulated signal via the equalizer circuit, which comprises a plurality of correction coefficients; and defining the plurality of correction coefficients according to a predetermined rule, the digital reference signal, and the digital receiving signal.

DETAILED DESCRIPTION OF THE PREFERRED EMBODIMENT

Figure 1:
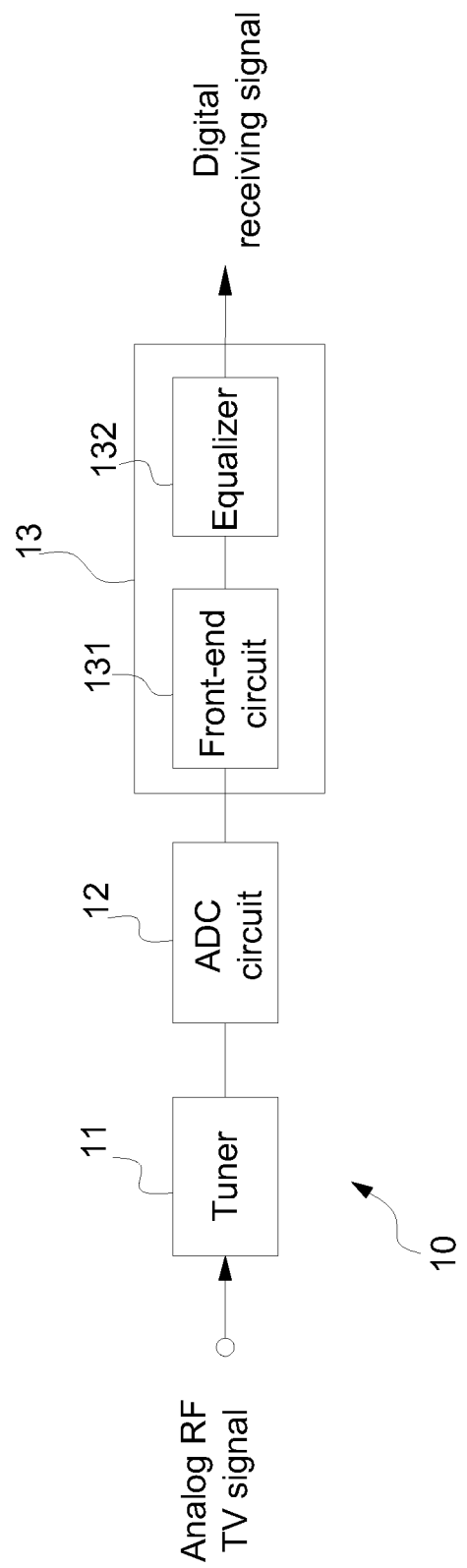
FIG. 1 is a block diagram of an analog TV signal receiving circuit in accordance with an embodiment of the present invention.

FIG. 1 is a block diagram of an analog TV signal receiving circuit in accordance with an embodiment of the present invention. An analog TV signal receiving circuit 10 comprises a tuner 11, an ADC circuit 12, and a digital demodulator 13. The tuner 11 performs frequency conversion on an analog RF TV signal received by the analog TV signal receiving circuit 10 to generate an analog frequency down conversion signal, which is optionally in various forms, but is mainly an intermediate (IF) signal. Such types of analog RF TV signals can conform to any type of analog TV specification, e.g., NTSC, PAL, SECAM, and the like. The ADC 12 performs analog-to-digital conversion to convert the analog frequency down conversion signal to a digital frequency down conversion signal. The digital demodulator 13 comprises a front-end circuit 131 and an equalizer 132. The front-end circuit 131 generates a digital demodulated signal according to the digital frequency down conversion signal. The equalizer 132 generates a digital receiving signal according to the digital demodulated signal for performing subsequent signal processing, e.g., decoding. The equalizer 132 comprises a plurality of correction coefficients that are generated according to a predetermined rule, e.g., a least mean square (LMS) algorithm to be described below. In this embodiment, a main function of the equalizer 132 is to adjust signal distortion created in processing performed on a TV signal received by the analog TV signal receiving circuit 10, e.g., the ringing effect or the ghost effect may occur during signal processing of the tuner 11, the ADC 12, and the front-end circuit 131.

Figure 2:
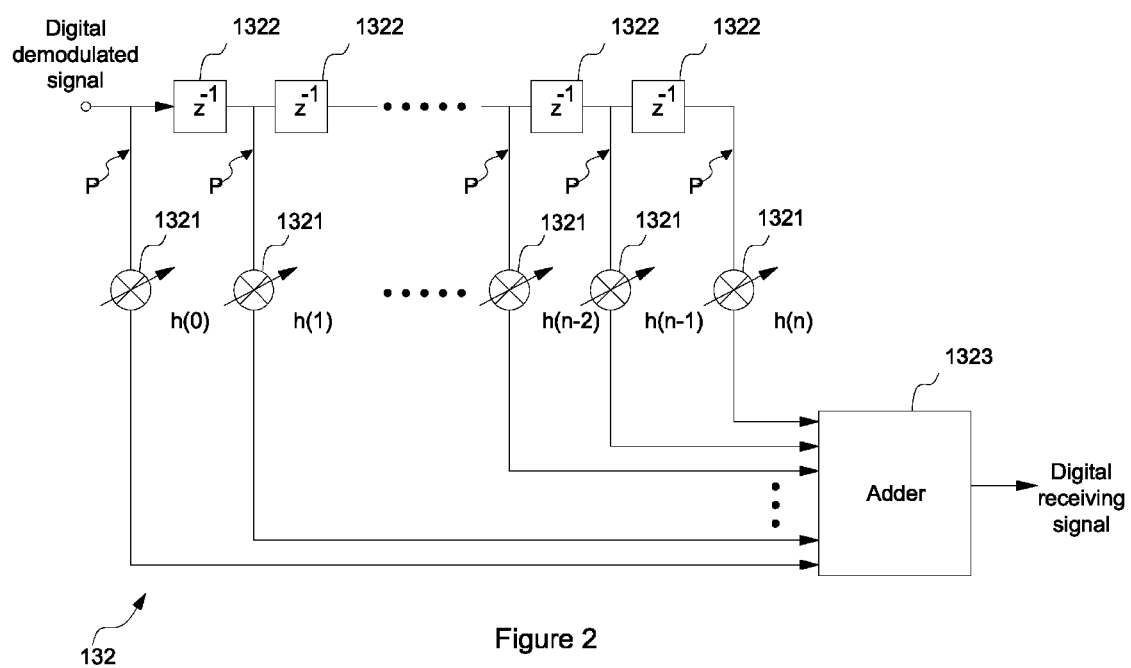
FIG. 2 is a schematic diagram of the equalizer shown in FIG. 1 in accordance with an embodiment of the present invention.

FIG. 2 shows a schematic diagram of the equalizer 132 shown in FIG. 1. In this embodiment, the equalizer 132 comprises a finite impulse response (FIR) filter comprising n+1 taps P, where n is a positive integer, and each tap P corresponds to a weight coefficient—a correction coefficient generated according to the foregoing predetermined rule. Referring to FIG. 2, each tap P has a multiplexer 1321 corresponding to a weight coefficient h(k), where k is between 0 and n. In addition, a delay component 1322 is coupled between every two adjacent taps P, and outputs of taps P are summed and outputted via an adder 1323. Equalization is performed on the digital demodulated signal outputted by the front-end circuit 131 via the FIR filter in FIG. 2 to adjust the signal distortion.

Figure 3:
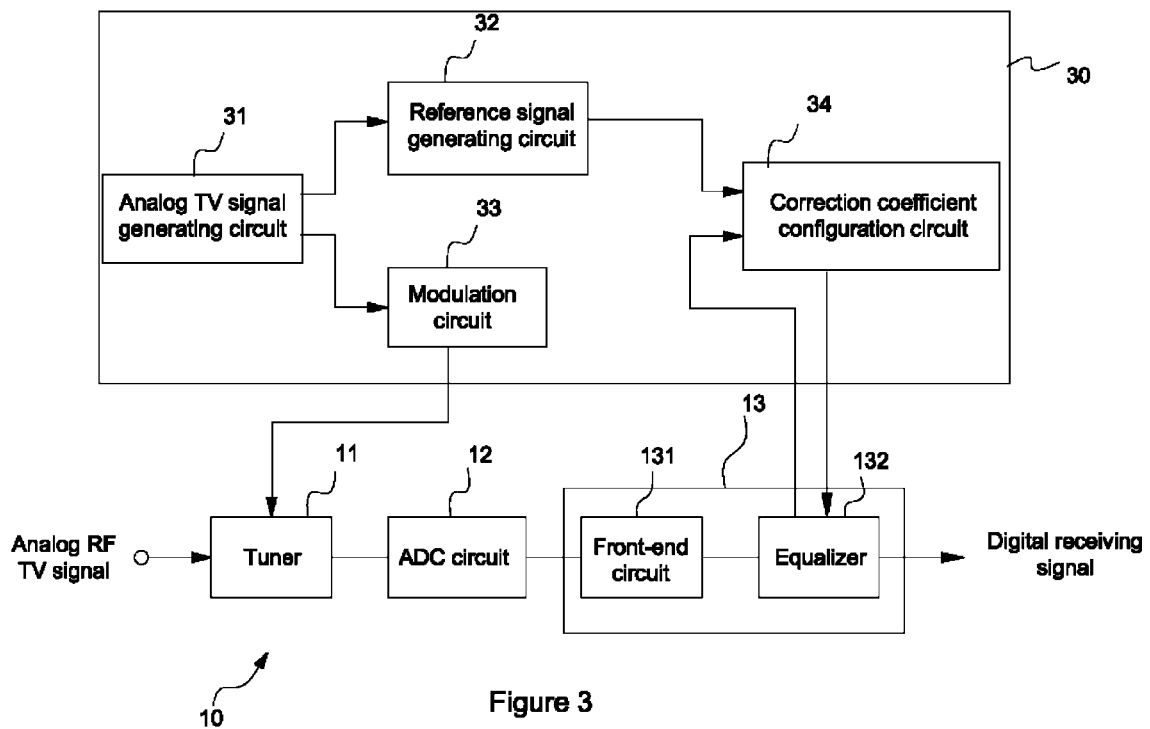
FIG. 3 is a block diagram of an equalizer circuit coefficient defining apparatus in accordance with an embodiment of the present invention.

In an embodiment, the analog TV signal receiving circuit 10 further comprises an equalizer coefficient defining apparatus 30 for defining correction coefficients of the equalizer 132 as shown in FIG. 3. In the equalizer coefficient defining apparatus 30, two identical simulation analog TV signals pass through two paths, of which a digital reference signal is outputted along one path and transmission (not including channel transmission) and reception of the analog TV signal are simulated along the other path, so as to output a simulation digital receiving signal. The simulation digital receiving signal is compared with the foregoing digital reference signal to accurately and specifically estimate an extent of the signal distortion created in the reception process of the analog TV signal received by the analog TV signal receiving circuit. More specifically, the equalizer coefficient defining apparatus 30 comprises an analog TV signal generator 31, a reference signal generator 32, a modulator 33, and a correction coefficient configuration circuit 34. The analog TV signal generator 31 provides a simulation analog TV signal that is not limited to any particular type of analog TV specification. The simulation analog TV signal has a specific image pattern, and more specifically, has an image pattern to more easily to create image distortion. The pattern is readily apparent to a person having ordinary skill in the art, and details thereof shall not be described for brevity. The reference signal generator 32, being one of the foregoing two paths, generates the digital reference signal according to the simulation analog TV signal provided by the analog TV signal generator, e.g., the reference signal generator 32 is an ADC, which directly converts the simulation analog TV signal to a simulation digital TV signal regarded as the digital reference signal.

The other path is formed by modulator 33 and the analog TV signal receiving circuit 10. The modulator 33 modulates the simulation analog TV signal provided by the analog TV signal generator 31 to a simulation analog RF TV signal, aiming to simulate a transmission end for the analog TV signal. The analog TV signal receiving circuit 10 coupled to the modulator 33 receives the simulation analog RF TV signal that is in sequence processed by internal circuits (including the tuner 11, the ADC 12, the front-end circuit 131, and the equalizer 132, wherein a signal outputted from the front-end circuit 131 to the equalizer 132 is a simulation digital demodulated signal) to generate the foregoing simulation digital receiving signal, aiming to simulate a receiving end for the analog TV signal. Therefore, the simulation digital receiving signal is a digital version of the simulation analog TV signal that is processed via modulation and demodulation. The extent of the signal distortion is estimated by comparing the simulation digital receiving signal with the foregoing digital reference signal (i.e., the directly-digitalized simulation analog TV signal). In addition, since the channel transmission is not contained in the other path, the equalizer coefficient configuration apparatus 30 in FIG. 3 mainly estimates the signal distortion created at the receiving end without consideration of the channel transmission effect.

The correction coefficient configuration circuit 34, coupled to the reference signal generator 32 and the equalizer 132 respectively, defines the correction coefficients of the equalizer 132 according to the digital reference signal, the simulation digital receiving signal, and the abovementioned predetermined rule. Preferably, the predetermined rule is the LMS algorithm. An approach for the correction coefficient configuration circuit 34 to define the correction coefficients of the equalizer 132 according to the LMS algorithm is further described below. The correction coefficient configuration circuit 34 performs synchronization on the digital reference signal and the simulation digital receiving signal to estimate a difference between the two signals. Since the simulation analog TV signal provided by the analog TV signal generating circuit 31 comprises a synchronization signal (e.g., a vertical synchronization (V-Sync) signal) and a horizontal synchronization (H-Sync) signal, which respectively represent start time points of each TV frame and each scan line, so that both of the digital reference signal and the simulation digital receiving signal comprise the synchronization signals. The correction coefficient configuration circuit 34 performs synchronization of the digital reference signal and the simulation digital receiving signal via the synchronization signals.

The correction coefficient configuration circuit 34 calculates the correction coefficients of the equalizer 132 according to following Equation 1 and Equation 2.

$$e_i = d_i - x_i, \text{ where } x_i = \vec{h}_i \otimes \vec{r}_i; \quad \text{Equation 1:}$$

$$\vec{h}_{i+1} = \vec{h}_i + \mu e_i \vec{r}_i; \quad \text{Equation 2:}$$

The index i is a positive integer. In Equation 1, $x_i$ is an ith output signal (i.e., the simulation digital receiving signal) of the equalizer 132, and $d_i$ is an ith output signal (i.e., the digital reference signal) of the reference signal generating circuit 32, so that $e_i$ is the difference (i.e., a so-called difference signal) between the simulation digital receiving signal and the digital reference signal. It is to be noted that, $x_i = \vec{h}_i \otimes \vec{r}_i$ in Equation 1 represents a calculation process of the equalizer 132 in FIG. 2. That is, $\vec{h}_i$ represents an ith weight coefficient (i.e., an correction coefficient) of each tap P, i.e., vectors $h(0)_i$, $h(1)_i, \ldots, h(n)_i$, that represent current values of the weight coefficient. Similarly, $\vec{r}_i$ represents a current value (i.e., the simulation digital demodulated signal) temporarily stored in each delay component 1322 and the simulation digital demodulated signal currently inputted into the equalizer 132, i.e., vectors formed by consecutive n+1 sampling values of the simulation digital demodulated signal. Therefore, $x_i$ outputted by the equalizer 132 is equal to a convolution of the two vectors $\vec{h}_i$ and $\vec{r}_i$.

When the difference signal $e_i$ is obtained via Equation 1, the (i+1)th weight coefficient of each tap P of the equalizer 132 is calculated according to Equation 2 to be represented as vectors $(h(0)_{i+1}, h(1)_{i+1}, \ldots, h(n)_{i+1})$, meaning a next value of the weight coefficient (compared to the current value of the weight coefficient). In Equation 2, μ represents a coefficient adjustment value that is dynamically adjusted during the entire coefficient configuration process. When μ is too large, the coefficients of the equalizer 132 fail in convergence due to oscillation, and when μ is too small, the coefficient definition may cost excessive time or processing power; however, a person having ordinary skills in the art can determine an appropriate μ according to specific application requirements. The correction coefficient configuration circuit 34 distributes the new weight coefficient obtained according to Equation 2 to taps P of the equalizer 132, and the equalizer coefficient configuration apparatus 30 iterates the foregoing operations according to the new weight coefficient until a converged weight coefficient is obtained. For example, when correction coefficient configuration circuit 34 determines $|\vec{h}_k - \vec{h}_{k+1}| \leq T$ during operations, and k is a certain positive integer and T is a predetermined positive value, the foregoing coefficient adjustment value μ is defined as 0 to interrupt the LMS algorithm.

Figure 4:
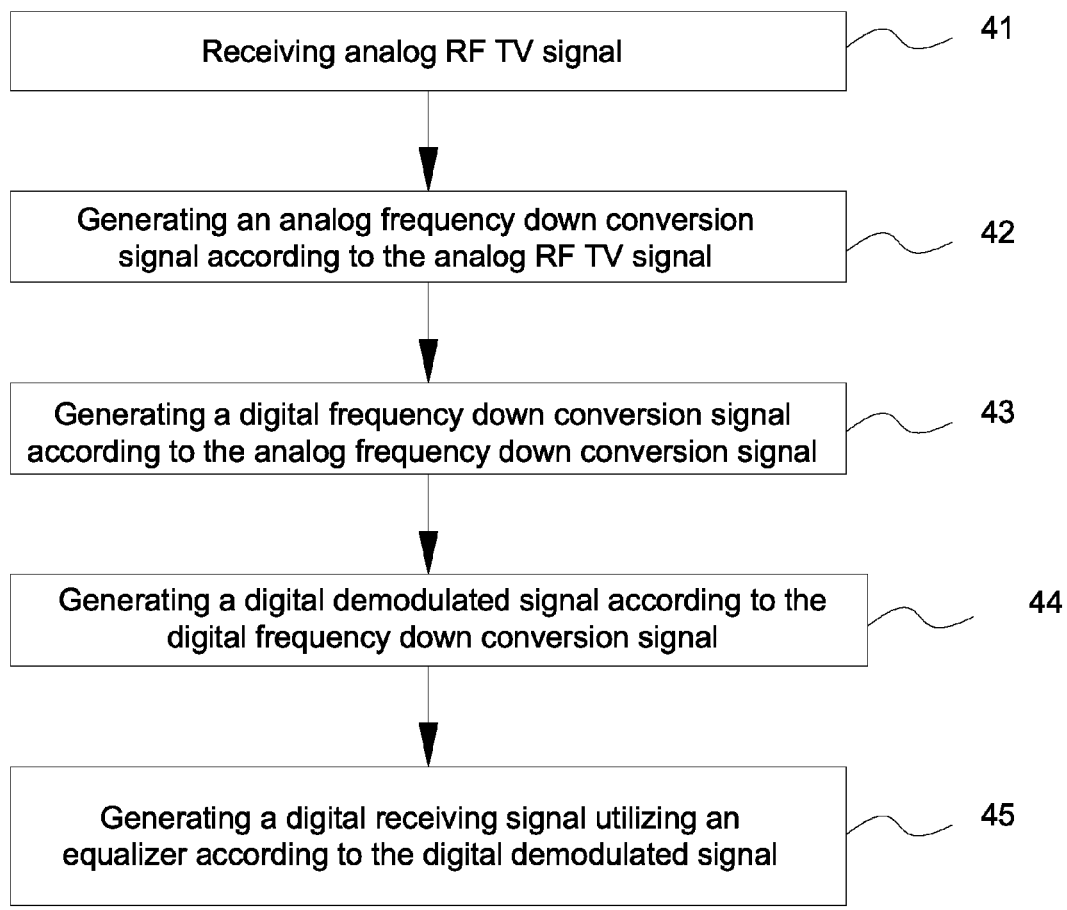
FIG. 4 is a flow chart of an analog TV signal receiving method in accordance with an embodiment of the present invention.

FIG. 4 is a flow chart of a method for reducing signal distortion when an analog TV signal receiving circuit is receiving signals in accordance with an embodiment of the present invention. The method is applied to the analog TV signal receiving circuit 10 shown in FIG. 1. In Step 41, an analog RF TV signal is received. In Step 42, an analog frequency down conversion signal is generated according to the analog RF TV signal. In Step 43, a digital frequency down conversion signal is generated according to the analog frequency down conversion signal. In Step 44, a digital demodulated signal is generated according to the digital frequency down conversion signal. In Step 45, a digital receiving signal is generated via an equalizer (e.g., the equalizer 132 as shown in FIG. 1) according to the digital demodulated signal. The equalizer comprises a plurality of correction coefficients that are generated according to a predetermined rule, e.g., the LMS algorithm. Step 45 is to adjust signal distortion generated during Step 42 and Step 44, e.g., a ringing effect and a ghost effect.

Figure 5:
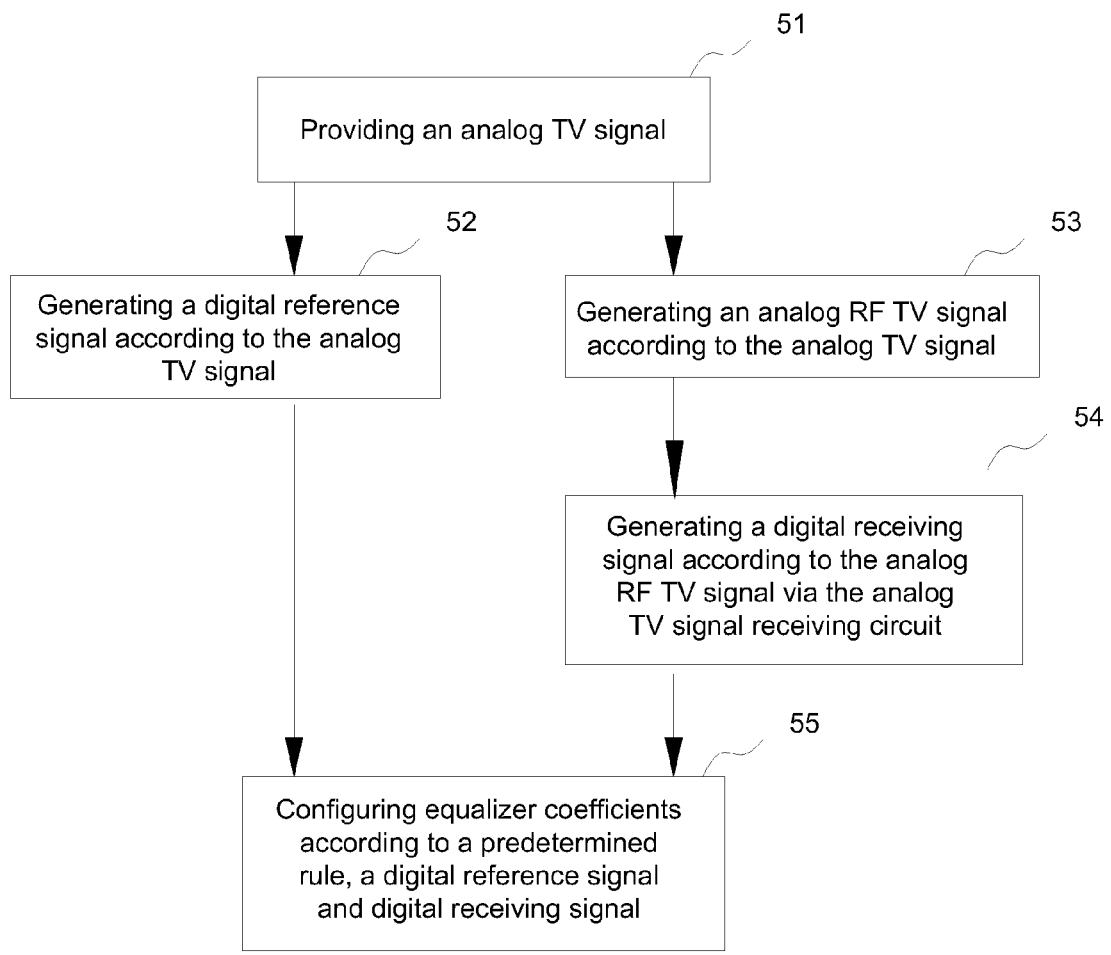
FIG. 5 is a flow chart of a method for defining coefficients of an equalizer in accordance with an embodiment of the present invention.
Figure 6:
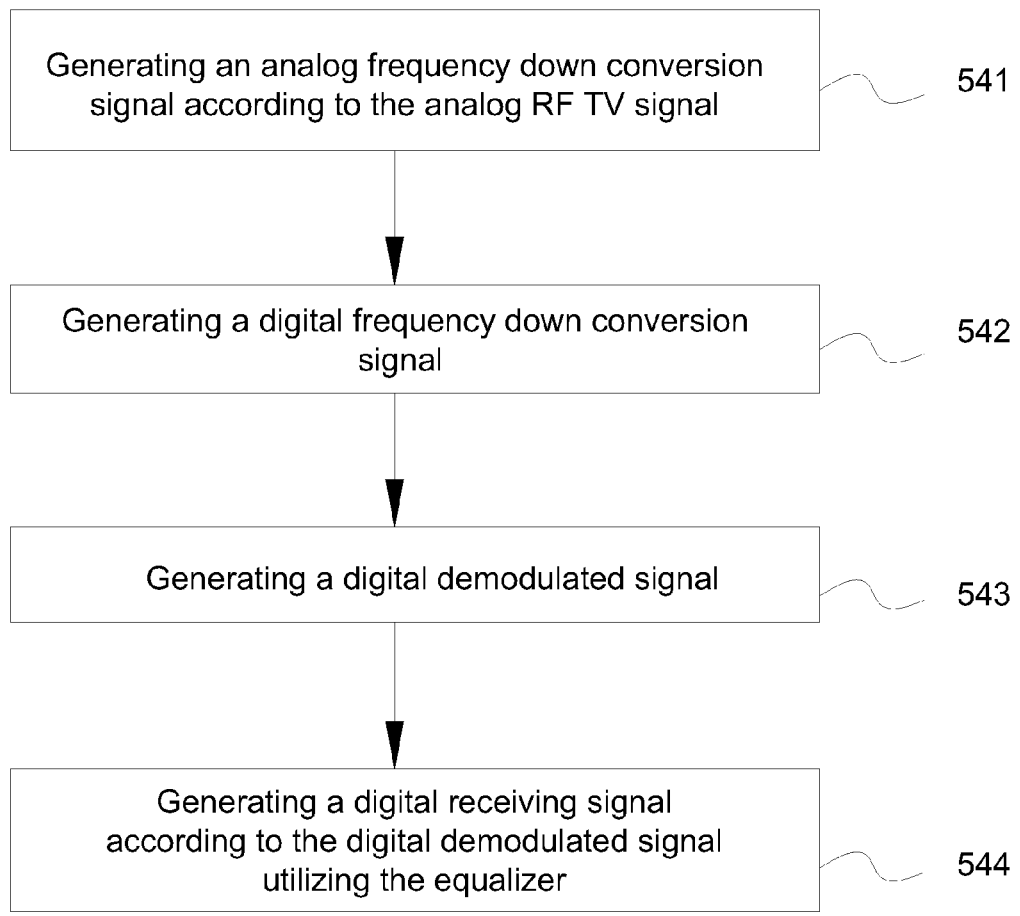
FIG. 6 is a flow chart of details of generating an analog RF TV signal (Step 54) illustrated in FIG. 5.

FIG. 5 is a flow chart of a method for defining configuration coefficients of an equalizer in accordance with an embodiment of the present invention. The method is applied to the equalizer coefficient configuration apparatus 30 shown in FIG. 3. In Step 51, an analog TV signal is provided. After the analog TV signal is provided, two types of processing take place. In Step 52, a digital reference signal is generated according to the analog TV signal. In Step 53, an analog RF TV signal is generated according to the analog TV signal. In Step 54, according to the analog RF TV signal, a digital receiving signal is generated via an analog TV signal receiving circuit (e.g., the analog TV signal receiving circuit 10 shown in FIG. 1). The generation of a digital receiving signal described in Step 54 can be seen in greater detail referring to FIG. 6, comprising the following steps. In Step 541, an analog frequency down conversion signal is generated according to the analog RF TV signal. In Step 542, a digital frequency down conversion signal is generated according to the analog frequency down conversion signal. In Step 543, a digital demodulated signal is generated according to the digital frequency down conversion signal. In Step 544, according to the digital demodulated signal, the digital receiving signal is generated via an equalizer of the analog TV signal receiving circuit, e.g., the equalizer 132 of the analog TV signal receiving circuit 10. Returning to FIG. 5, the plurality of correction coefficients of the equalizer are defined according to a predetermined rule, the digital reference signal, and the digital receiving signal in Step 55. When the predetermined rule is the LMS algorithm, Step 55 comprises synchronizing the digital reference signal and the digital receiving signal; calculating a difference between the digital reference signal and the digital receiving signal; and configuring next values of the correction coefficients according to current values of the correction coefficients, a coefficient adjustment value, the difference, and the digital demodulated signal.

In conclusion, an analog TV signal receiving circuit comprises an equalizer to adjust signal distortion created during a reception process of an analog TV signal, and correction coefficients of the equalizer are defined via a configuration apparatus and associated method provided by the present invention, resulting in a reduction of the signal distortion during analog television signal reception.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for reducing signal distortion during analog television (TV) signal receiving method, comprising:
   receiving an analog radio-frequency (RF) TV signal by a tuner;
   generating an analog frequency down conversion signal according to the analog RF TV signal;
   generating a digital frequency down conversion signal according to the analog frequency down conversion signal;
   generating a digital demodulated signal according to the digital frequency down conversion signal;
   correcting the digital demodulated signal utilizing an equalizer to generate a digital receiving signal, with the equalizer comprising a plurality of correction coefficients generated according to a predetermined rule;
   providing a simulation analog TV signal by an analog TV receiving circuit;
   generating a digital reference signal according to the simulation analog TV signal;
   generating a simulation analog RF TV signal according to the simulation analog TV signal, and transmitting the simulation analog RF TV signal to the tuner, with the simulation analog RF TV signal being processed to generate a simulation digital receiving signal; and
   generating the plurality of correction coefficients according to the predetermined rule, the digital reference signal, and the simulation digital receiving signal.

2. The method as claimed in claim 1, wherein the predetermined rule is a least mean square (LMS) algorithm.

3. The method as claimed in claim 1, wherein the step of generating the digital demodulated signal comprises adjusting signal distortion resulting when the digital demodulated signal is generated according to the analog RF TV signal.

4. The method as claimed in claim 3, wherein the signal distortion is generated due to a ringing effect or a ghost effect.

5. The method as claimed in claim 1, wherein the equalizer comprises a plurality of taps corresponding to the plurality of correction coefficients.

6. An analog television (TV) signal receiving circuit capable of reducing signal distortion during receiving, comprising:
   a tuner, for receiving an analog radio frequency (RF) TV signal to generate an analog frequency down conversion signal;

an analog-to-digital converter (ADC), for performing analog-to-digital conversion on the analog frequency down conversion signal to generate a digital frequency down conversion signal;

a demodulator, comprising:
    a front-end circuit, for generating a digital demodulated signal according to the digital frequency down conversion signal; and
    an equalizer, for adjusting the digital demodulated signal to generate a digital receiving signal, being associated with a plurality of correction coefficients that are generated according to a predetermined rule; and an equalizer coefficient configuration apparatus comprising:
    an analog TV signal generator, for providing a simulation analog TV signal;
    a reference signal generator, for generating a digital reference signal according to the simulation analog TV signal;
    a modulator, coupled to the tuner, for generating a simulation analog RF TV signal according to the simulation analog TV signal, and transmitting the simulation analog RF TV signal to the tuner, with the simulation analog RF TV signal being processed via the tuner, the ADC and the demodulator to generate a simulation digital receiving signal; and
    an correction coefficient configuration circuit, for generating the plurality of correction coefficients according to the predetermined rule, the digital reference signal, and the simulation digital receiving signal.

7. The analog TV signal receiving circuit as claimed in claim 6, wherein the predetermined rule is a least mean square (LMS) algorithm.

8. The analog TV signal receiving circuit as claimed in claim 6, wherein the equalizer corrects signal distortion generated during signal processing of the tuner, the ADC and the front-end circuit.

9. The analog TV signal receiving circuit as claimed in claim 8, wherein the signal distortion is generated due to a ringing effect or a ghost effect.

10. The analog TV signal receiving circuit as claimed in claim 6, wherein the equalizer comprises a plurality of taps respectively corresponding to the plurality of correction coefficients.

11. The analog TV signal receiving circuit as claimed in claim 6, wherein the predetermined rule is an LMS algorithm.

12. The analog TV signal receiving circuit as claimed in claim 11, wherein the simulation analog RF TV signal is processed via the tuner, the ADC and the front-end circuit to generate a simulation digital demodulated signal, and the correction coefficient configuration circuit calculates a difference between the digital reference signal and the simulation digital receiving signal, and configures at least one next value of the correction coefficients according to current values of the correction coefficients, a coefficient adjustment value, the difference and the simulation digital demodulated signal.

13. The analog TV signal receiving circuit as claimed in claim 12, wherein the correction coefficient configuration circuit synchronizes the digital reference signal with the simulation digital receiving signal before the difference is generated.

14. A method for configuring an equalizer, the equalizer applied to an analog television (TV) signal receiving circuit, the method comprising:
    providing an analog radio frequency (RF) TV signal;
    generating an analog frequency down conversion signal according to the analog RF TV signal;
    generating a digital frequency down conversion signal according to the analog frequency down conversion signal;
    generating a digital reference signal according to a simulation analog TV signal generated by an analog TV signal generator;
    generating a simulation analog RF TV signal according to the simulation analog TV signal;
    generating a simulation receiving signal according to the simulation analog RF TV signal;
    generating a digital demodulated signal according to the digital frequency down conversion signal via the analog TV signal receiving circuit;
    generating a digital receiving signal according to the digital demodulated signal via the equalizer, with the equalizer comprising a plurality of correction coefficients; and
    configuring the plurality of correction coefficients of the equalizer according to a predetermined rule, the digital reference signal, and the simulation receiving signal.

15. The method as claimed in claim 14, wherein the predetermined rule is a least mean square (LMS) algorithm.

16. The method as claimed in claim 15, wherein the step of defining the plurality of correction coefficient of the equalizer comprises:
    calculating a difference between the digital reference signal and the digital receiving signal; and
    configuring at least one next value of the correction coefficients according to current values of the correction coefficients, a coefficient adjustment value, the difference and the digital demodulated signal.

17. The method as claimed in claim 16, wherein the step of defining the correction coefficients of the equalizer comprises:
    synchronizing the digital reference signal with the digital receiving signal before calculating the difference.

18. The method as claimed in claim 16, wherein the step of generating the digital demodulated signal according to the analog RF TV signal via the analog TV signal receiving circuit comprises:
    generating the digital demodulated signal according to the digital frequency down conversion signal.

* * * * *